(12) United States Patent
Robbins et al.

(10) Patent No.: US 8,487,937 B2
(45) Date of Patent: Jul. 16, 2013

(54) REPRESENTING ANIMATION AS A STATIC IMAGE ON A GRAPHICAL USER INTERFACE

(75) Inventors: Daniel C Robbins, Seattle, WA (US);
Desney S Tan, Kirkland, WA (US);
George G Robertson, Seattle, WA (US);
Kenneth P Hinckley, Redmond, WA (US); Maneesh Agrawala, Seattle, WA (US); Patrick M Baudisch, Seattle, WA (US); Steven M Drucker, Redmond, WA (US); Tovi S Grossman, Toronto (CA)

(73) Assignee: Microsoft Corporation, Redmond, WA (US)

( * ) Notice: Subject to any disclaimer, the term of this patent is extended or adjusted under 35 U.S.C. 154(b) by 1447 days.

(21) Appl. No.: 11/325,912

(22) Filed: Jan. 4, 2006

(65) Prior Publication Data

US 2007/0153006 A1    Jul. 5, 2007

(51) Int. Cl.
*G06T 13/00* (2011.01)

(52) U.S. Cl.
USPC .......................................................... 345/473

(58) Field of Classification Search
USPC .......................................................... 345/473
See application file for complete search history.

(56) References Cited

PUBLICATIONS

Chang et al., "Animation: From Cartoons to the User Interface", 1993, ACM, pp. 45-55.*

Assa, J., et al., "Action Synopsis: Pose Selection and Illustration," *Proceedings of the 32nd International Conference on Computer Graphics and Interactive Techniques*, Los Angeles, Jul. 31-Aug. 1-4, 2005, pp. 667-676.

Baudisch, P., et al., "Drag-and-Pop and Drag-and-Pick: Techniques for Accessing Remote Screen Content on Touch- and Pen-Operated Systems," *Proceedings of the 9th International Conference on Human-Computer Interaction*, Zurich Switzerland, Sep. 1-5, 2003, pp. 57-64.

Chang, B.-W. and D. Unger, "Animation: From Cartoons to the User Interface," *Proceedings of the 6th Annual ACM Symposium on User Interface Software and Technology*, Atlanta, Georgia, Nov. 3-5, 1993, pp. 45-55.

Hoobler, N., et al., "Visualizing Competitive Behaviors in Multi-User Virtual Environments," *Proceedings of the Conference on Visualization '04*, Austin, Texas, Oct. 10-15, 2004, pp. 163-170.

Kaptelinin, V., et al., "Transient Visual Cues for Scrolling: an Empirical Study," *Proceedings of the Conference on Human Factors in Computing Systems, CHI '02 Extended Abstracts*, Minneapolis, Minn., Apr. 20-25, 2002, pp. 620-621.

* cited by examiner

*Primary Examiner* — Hau Nguyen
(74) *Attorney, Agent, or Firm* — Lee & Hayes, PLLC

(57) ABSTRACT

A computer system and for displaying a static animation image in response to an action related to a displayed object that occurs on the computer system is presented. An initial state of the displayed object is determined with regard to the action. A final state of the displayed object with regard to the action is also determined. Transition aspects between the initial state and the final state are then determined. A static animation image is generated according to the initial state, the transition aspects, and the final state. The static animation image represents, in static form, an animation indicative of the action from the initial state to the final state of the displayed object. The static animation image is displayed on the graphical user interface in lieu of animation.

16 Claims, 11 Drawing Sheets

REPRESENTING ANIMATION AS A STATIC IMAGE ON A GRAPHICAL USER INTERFACE

BACKGROUND

Animation is frequently used on computers in user interfaces to provide a user with visual feedback of some corresponding action or transition that is occurring on the computer. While there are many types of animation in user interfaces, a few examples include changing the location of an icon, modifying the appearance of a displayed object, or leaving a disappearing trail of images to provide feedback of a particular path a pointer took.

As those skilled in the art will appreciate, animation includes an element, or dimension, of time. In other words, animated behavior occurs over a period of time. However, there are server issues with regard to the time element on user interfaces. One issue is that there is always a question as to how much time a given animated behavior should take. Because animation demonstrates to the user what action has been taken or is occurring, in some cases a long and lengthy animation is preferable. A lengthy animation is often especially useful for first time users of a product as the lengthy animation provides feedback as to what is occurring. However, that same lengthy animation may become undesirable, even an annoying delay, as the user becomes more familiar with the product and no longer needs the feedback.

Of course, there is also an issue with regard to actually programming the animation. More particularly, an animation developer must determine both the nature or behavior of the animation as well as the amount of time animation over which the animation occurs. Presumably, the animation developer will attempt to balance the fact that there will be seasoned users (i.e., those who do not need lengthy animations, if any at all) and novice users (i.e., those who would greatly benefit from an appropriate amount of animation). Additionally, given the wide range of computers upon which a given product may operate, care must be taken such that a particular animation will operate as intended, including its designed speed and time. With all of these factors, it is often daunting to design the "perfect" animation.

Still another issue related to animation is the fact that most computers are now multi-tasking, meaning that more than one action may occur on the computer at the same (or nearly the same) time. Thus, the possibility that multiple animations occur on the same user interface can be very high. Unfortunately, a user can almost never cognizantly process more than one or two disparate animations that occur on the user interface. Thus, when multiple animations occur at or near the same time on a computer screen, there is a great likelihood that a user will actually miss all or part of any given animation. As an animation is typically an indication that something occurred in the computer, the likelihood that a user misses some event, perhaps a very critical event, is substantial.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A computer system for displaying a static animation image in response to an action related to a displayed object that occurs on the computer system is presented. An initial state of the displayed object is determined with regard to the action. A final state of the displayed object with regard to the action is also determined. Transition aspects between the initial state and the final state are then determined. A static animation image is generated according to the initial state, the transition aspects, and the final state. The static animation image represents, in static form, an animation indicative of the action from the initial state to the final state of the displayed object. The static animation image is displayed on the graphical user interface in lieu of animation.

A computer system for displaying static animation images to a user in response to an action involving a displayed object on a graphical display device is also presented. The computer system comprises a processor, a memory, and a graphical display device. In response to an action that occurs on the computer system, the computer system performs the following. An initial and final state of the displayed object is determined with regard to the action. Transition aspects between the initial and final states are determined. A static animation image is generated according to the initial state, the transition aspects, and the final state. The static animation image represents, in static form, an animation indicative of the action from the initial state to the final state of the displayed object. The static animation image is displayed on the graphical user interface in lieu of animation of the displayed object.

A method for displaying a static animation image in response to an action related to a displayed object that occurs on the computer system is further presented. The method comprising each of the following as executed on a computer system. An initial state of the displayed object with regard to the action is determined. A final state of the displayed object with regard to the action is also determined. A transition path between the initial state and the final state is then determined. A static animation image is generated according to the initial state, the transition path, and the final state. The static animation image represents, in static form, an animation indicative of the action from the initial state to the final state of the displayed object. The static animation image is displayed on the graphical user interface in lieu of animation.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Rather than presenting an animation that occurs over time, a static animation image is displayed. A static animation image is displayed instantaneously (or near instantaneously) and the image attempts to illustrate and/or explain the represented animation.

Figure 1A:
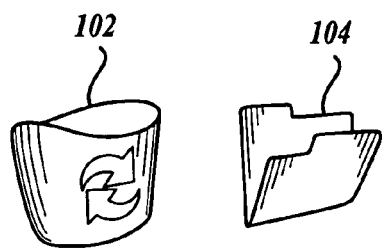
FIGS. 1A-1G are pictorial diagrams illustrating exemplary icons, and for further illustrating various aspects of generating a static animation for display on a graphical user interface.
Figure 1B:
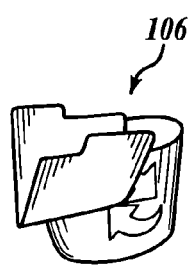
Figure 1C:
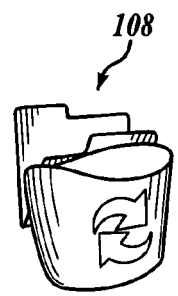

A static animation image will typically be based on three separate phases of a representative animation: an initial state, a transition, and an ending state. FIGS. 1A-1G illustrate the various phases and components that go into generating a static animation image. To illustrate this idea, two icons, icons 102 and 104 (FIG. 1A), will be used. FIG. 1B illustrates the initial state 106 of the two icons on a graphics interface, with icon 104 in front of and partially obscuring icon 102. Alternatively, FIG. 1C illustrates the ending state 108, with icon 102 now in front of and partially obscuring icon 104.

Clearly, switching the Z-order of icons 102 and 104 could be done instantaneously and frequently, thus obviating the need for any particular animation. However, this simple, exemplary switch in the Z-order of icons 102 and 104 in a graphical interface is used because of its simplicity, and also because in the event that a user did not directly interact with one of the icons (thereby bringing that icon to the front in the Z-order), a switch in ordering could be easily overlooked and, thus, static animation would be extremely useful.

Figure 1D:
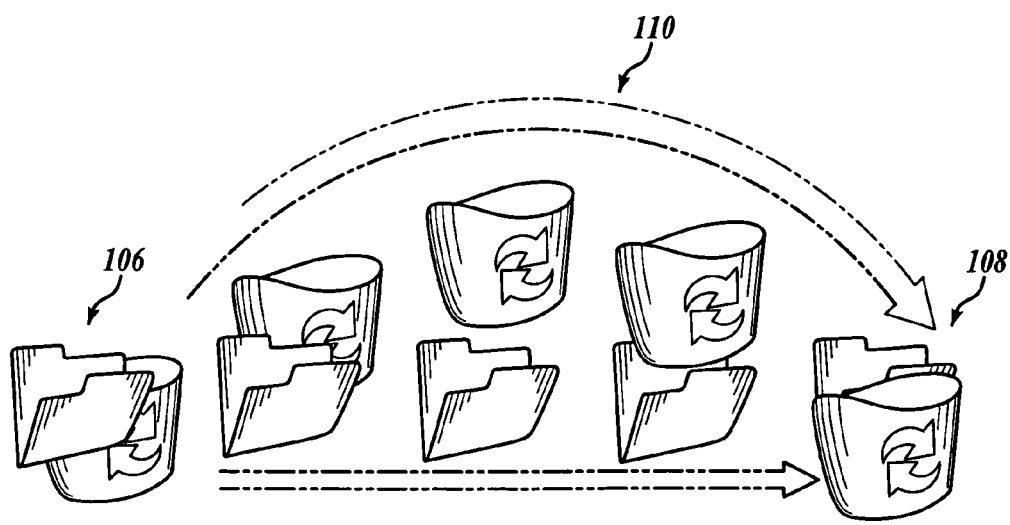

As indicated above, one of the phases upon which a static animation image is based is the transition from initial state to ending state. FIG. 1D illustrates an exemplary two dimensional transition 110 of icons 102 and 104 over time between the initial state 106 and ending state 108, with icon 102 moving up, over, and in front of icon 104.

Figure 1E:
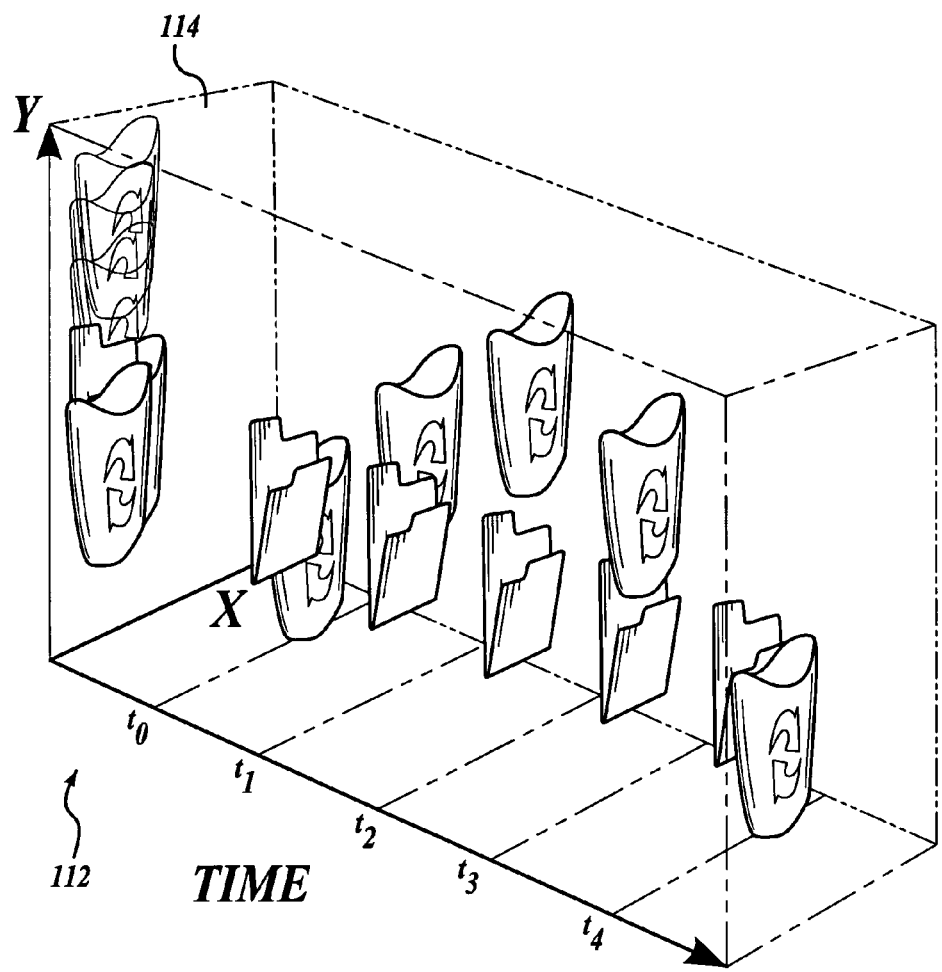

As will be described in greater detail below, once the transition is identified, various aspects of the transition are used to generate a static animation image. In one example, "snapshots" are taken at various periods during the transition, and a composite of the snapshots are presented as the static animation image. FIG. 1E is a pictorial diagram illustrating how a composite of snapshots could be used to generate a static animation image. In particular, FIG. 1E more accurately illustrates the transition 110 suggested in FIG. 1D, shown in three dimensions, including the time dimension. As shown in FIG. 1E, the initial state is found at time t0 on the time axis 112. Similarly, the ending state is found at time t4. Also shown between the initial and ending states are several intermediate snapshots at times t1-t3.

Figure 1F:
Figure 1G:
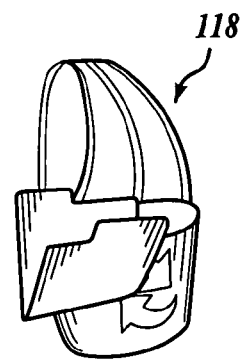

To generate a static animation image, in one embodiment, the initial state 106, each intermediate snapshot, and the ending state 108 are projected onto a 2D surface 114 in the X and Y axes, thereby creating a composite image 116. FIG. 1F is a pictorial diagram illustrating the composite image 116 of the snapshots taken at times t0-t4, with the final state 108 displayed "on top." Unfortunately, as can be seen in this example, the composite images may actually detract from the animation that it is to represent. Thus, while the static animation image 116 was generated using a useful algorithm (i.e., a composite of periodic snapshots of a proposed transition), animation images generated in other ways may more informatively demonstrate what actually happened. For example, FIG. 1G is a pictorial diagram showing a static animation image 118 that demonstrates the rearrangement of icons 102 and 104 as described above, where icon 102 is brought from behind icon 104 to in front of icon 104. With the faint outline of icon 102 behind icon 104 as well as the solid icon 102 in front of icon 104, and also illustrating a "swoosh" illustrating a transition path, static animation image 118 may be viewed as more accurately demonstrative of the animation represented in this example.

As a static animation image is displayed to indicate the current conditions as well as provide a retrospective view of what transpired, the ending state of the icon (or object more generally) is the most important of the three phases discussed above. With this in mind, a few general guidelines should be applied when generating an animation image. One guideline is that when using a composition of multiple snapshots of an image (or images) in transition, such as composite image 116 of FIG. 1F, more recent snapshots should be displayed on top of older snapshots. This ensures that the final snapshot, i.e., the ending state, is displayed on top and not obscured by intermediate snapshots.

Clearly, it is beneficial to assist the user in distinguishing between the initial and final states. To do so, and as another general guideline in generating static animation images, the initial and final states should be rendered differently. This means, therefore, that the final state should be rendered "as is," and any differences between the initial state and the final state are made with regard to the initial state. Rendering the initial state in an outline form, and/or with a degree or level of transparency, are examples of how an initial state may be rendered differently from the final state. Moreover, in one implementation, the further from the final state, the more transparent the image is displayed. For example, the initial state is rendered as the most transparent, with each snapshot closer to the final state more opaque.

With regard to the above-identified general guidelines, it should be appreciated that they are simply guidelines, and should not dictate how any particular static animation image is rendered, given a particular set of circumstances. Accordingly, the above mentioned guidelines should be viewed as illustrative only, and not construed as limiting rules for generating a static animation image.

Figure 2:
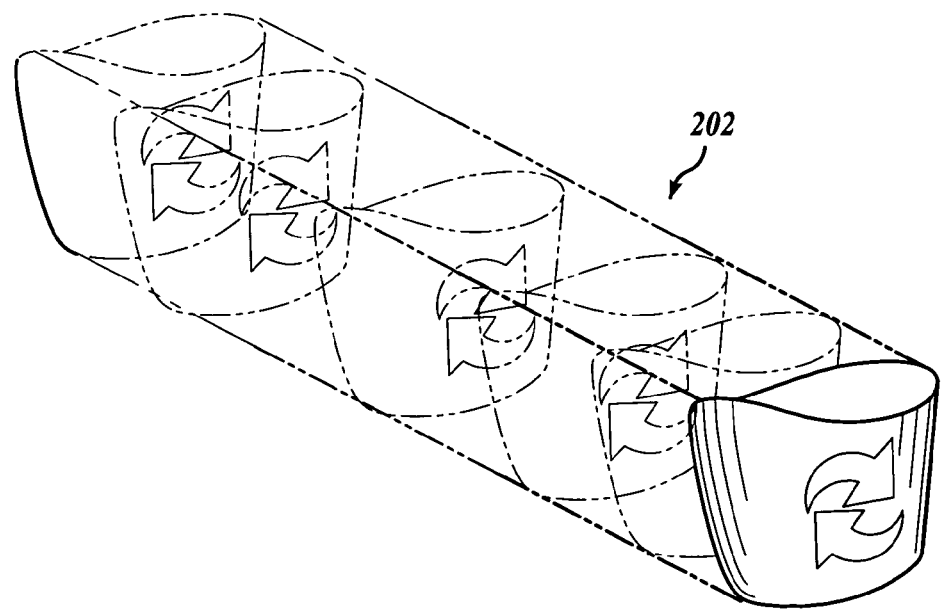
FIG. 2 is a pictorial diagram illustrating an exemplary static animation image generated using a strobe style.

There are various styles in which animation in a static animation image can be added. FIGS. 1D-1F are an example of a strobe type of animation, where snapshots of the transition from initial state to final state are taken at certain time intervals, and the results are composited/combined into a single static animation image. FIG. 2 is a pictorial diagram illustrating a more simple static animation image 202 generated using the strobe style discussed above. However, numerous other styles may be implemented, some of which are described below.

Figure 3:
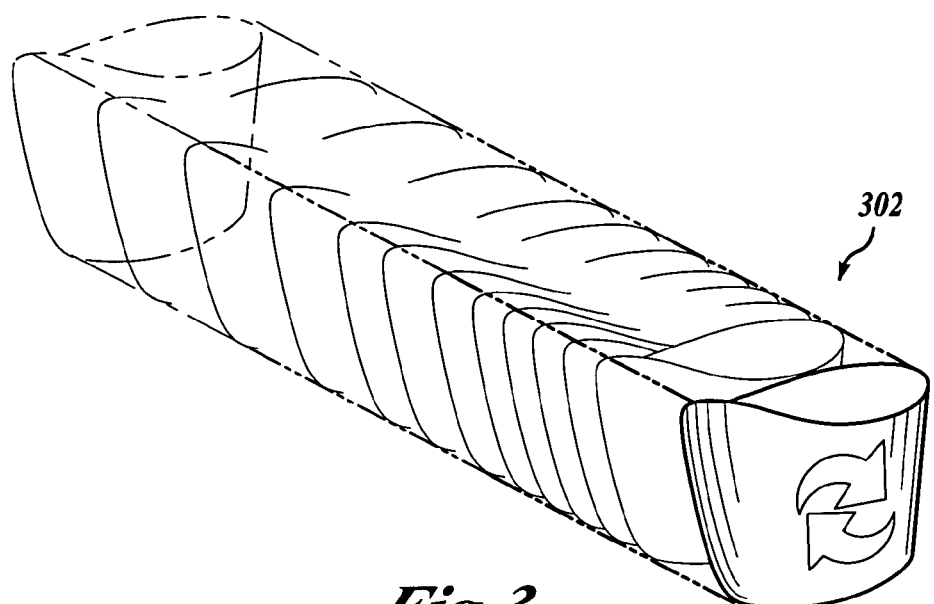
FIG. 3 is a pictorial diagram illustrating an exemplary static animation image generated using a motion blur style.

In addition to a strobe style of generating static animation images, two other common styles include a motion blur style and a transition lines style. FIG. 3 is a pictorial diagram illustrating an exemplary static animation image 302 generated using a motion blur style. As those skilled in the art will appreciate, a motion blur image is generated from a single copy of an image that is first compressed into a single pixel-width image and then stretched to a desired width. Experimentation has shown that a motion blur style of static animation image appears quite clean on a graphical user interface with little clutter.

Figure 4:
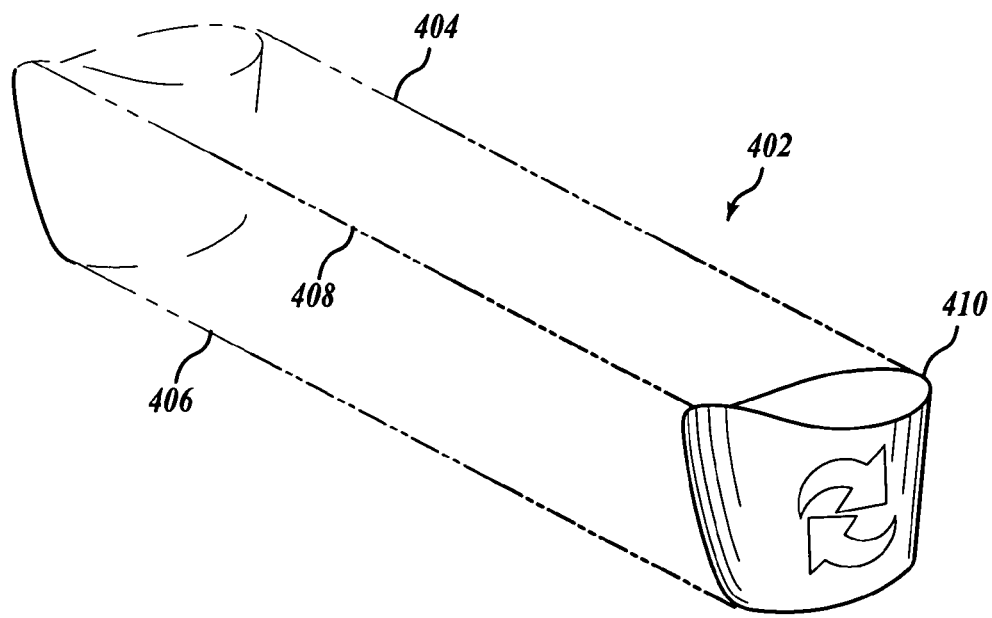
FIG. 4 is a pictorial diagram illustrating an exemplary static animation image generated using a transition lines style.

The other common style of generating static animation images is to use a transition lines, or speed lines, style, as shown in the static animation image 402 of FIG. 4. While transition lines can comprise any number of lines that make sense to one generating the image, the exemplary transition lines static animation image 402 includes three lines: a pair of edge lines 404 and 406, and a center line 408. The lines may be displayed on a background surface (not shown). By using characteristic colors sampled from the final state of the subject object/icon, the transition lines tend to have a greater affinity to the final state which helps a user to visually match a transition path to the final state of an object/icon 410.

While the time dimension of the animation is compressed or eliminated in a static animation image, the initial state as well as transition portion of the static animation image may fade as a function of time from the initial display of the static animation. In those implementations in which the earlier aspects of the animation are initially rendered more transparent than the latter aspects, fading the transition portion of the static animation image will cause the earlier aspects of the transition portion to fade before the latter aspects.

Figure 5:
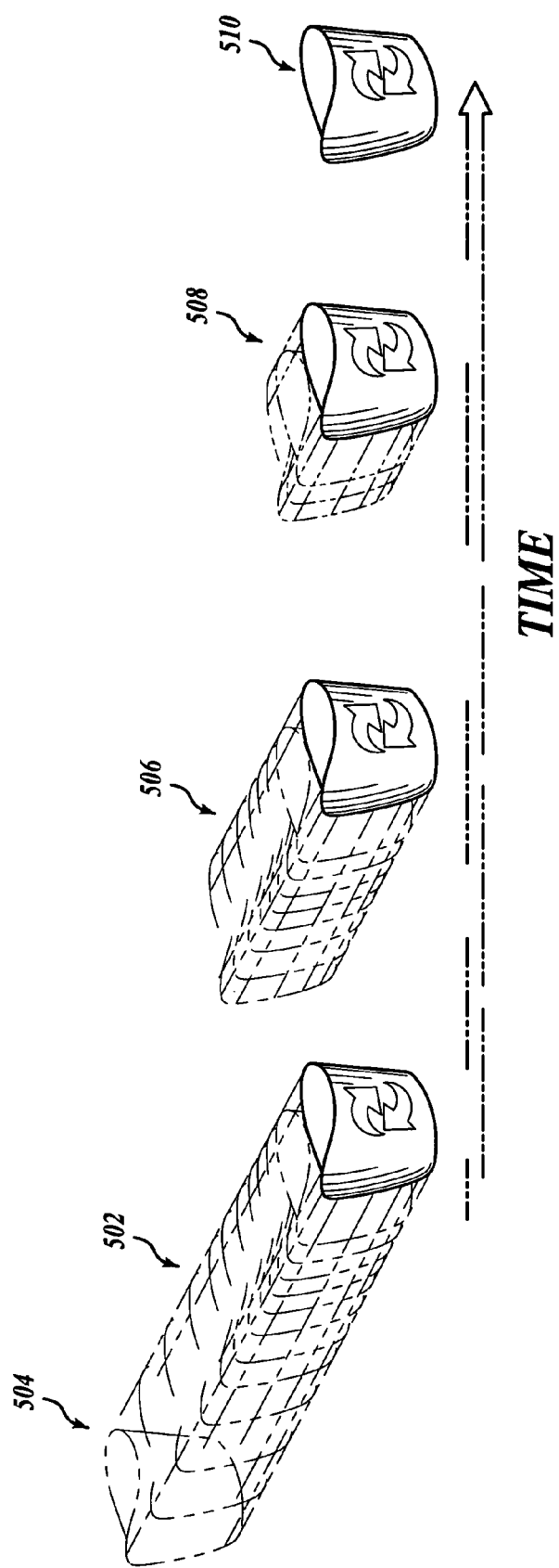
FIG. 5 is a pictorial diagram illustrating a series of exemplary static animation images as the transition portion of the animation fades over time.
Figure 6:
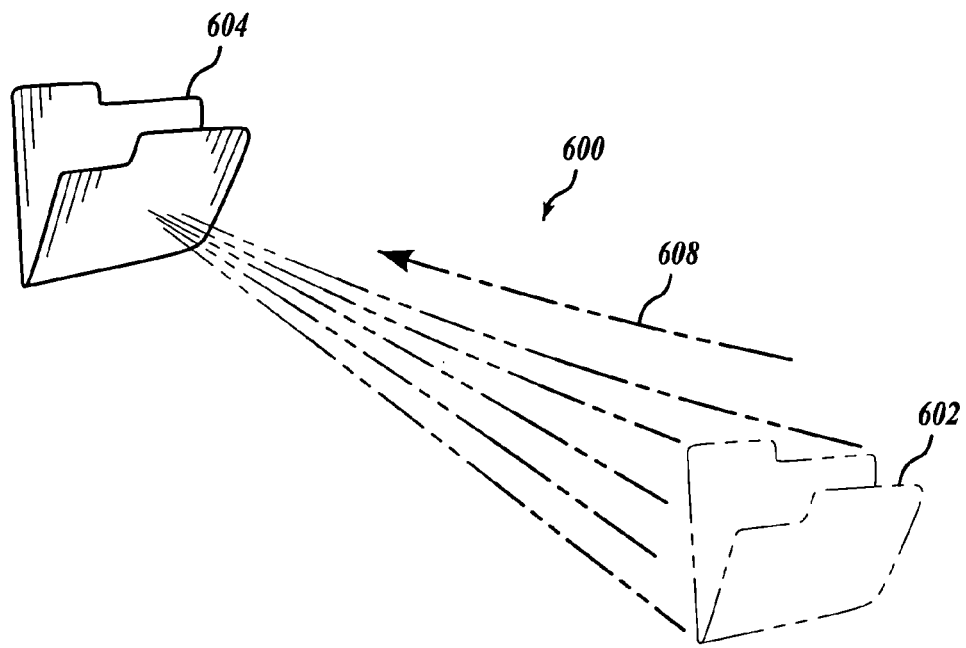
FIGS. 6 and 7 are pictorial diagrams illustrating exemplary static animation images and further demonstrating parent/child relationships.

FIG. 5 is a pictorial diagram illustrating a series of exemplary static animation images as the transition portion of the animation fades over time. More particularly, image 502 represents the initially displayed static animation image, with the initial state 504 displayed in outline to represent transparency. Image 506 represents the static animation image 502 after a given period of time, with the initial state 504 no longer visible. Similarly, image 508 represents even more time elapsed with a greater portion of the transition aspect of the static animation image 502 no longer visible. Finally, after a predetermined amount of time, only the final state 510 of the original static animation image 502 is displayed.

FIGS. 6-17 are pictorial diagrams illustrating exemplary static animation images depicting various actions and for illustrating various aspects of static animation. While these static animation images represent various actions, they are exemplary only, and should not be construed as limiting in any way. Static animation image 600 (FIG. 6) includes two separate objects, folder 602 and folder 604. The transition aspects 606 of this image 600 are developed using transition lines, and organized from wide to narrow to indicate that folder 602 was dropped onto folder 604. Optionally, arrow 608 may be displayed to provide additional information to the user as to the "direction" of the action.

Figure 7:
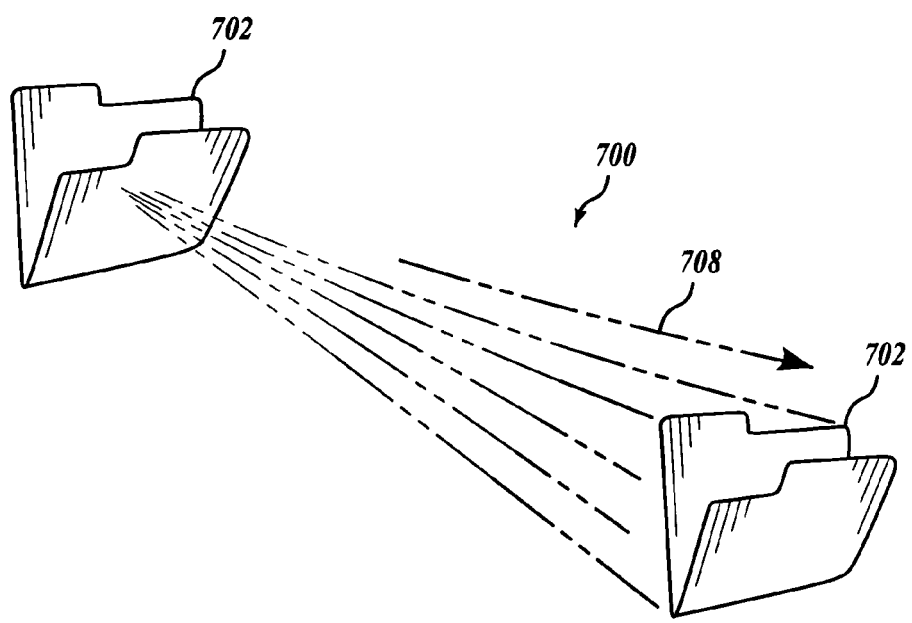

Often, where there is a distance between the initial state and final state, the transition aspect of a static animation image may be sufficient to inform a user as to which of the two displayed states is the final state. Moreover, the transition aspect should also inform the user as to the action taken. Thus, as a variation from the guidelines discussed above, it is not always necessary to display the initial state in a manner that is distinct from the final state. FIG. 7 illustrates this variation. More particularly, the static animation image 700, shown in FIG. 7, depicts extracting folder 702 from folder 704, with both folders rendered in their "normal" manner. The transition aspects of the animation image 700 are designed to indicate the action that occurred, i.e., taking folder 704 out of folder 702. Again, an arrow indicating a direction, such as arrow 708, may provide additional indicia as to the action and results, though perhaps ideally they would not be necessary.

As can be seen in both static animation images 600 and 700, the transition aspects 606 and 706 show a narrow to wide transition path. In some embodiments, such as those shown in FIGS. 6 and 7, tapering a transition path is illustrative of a parent/child relationship between two objects.

With regard to moving an object versus copying that object, in at least one implementation, if the final results of an action is that there are two objects, which is the case in copying, then both the original object (the initial state) and the copied object (part of the final state) are displayed in their normal fashion. Conversely, where the action is simply a movement of a single object from one location to another, the subject object is displayed in its original location (initial state) as an outline or substantially transparent, while the subject object (final state) is displayed in its final location in its normal fashion. In sum, when moving an object, the final state should indicate that there is only one object, whereas when copying, the final state should indicate that there are two objects.

Figure 8:
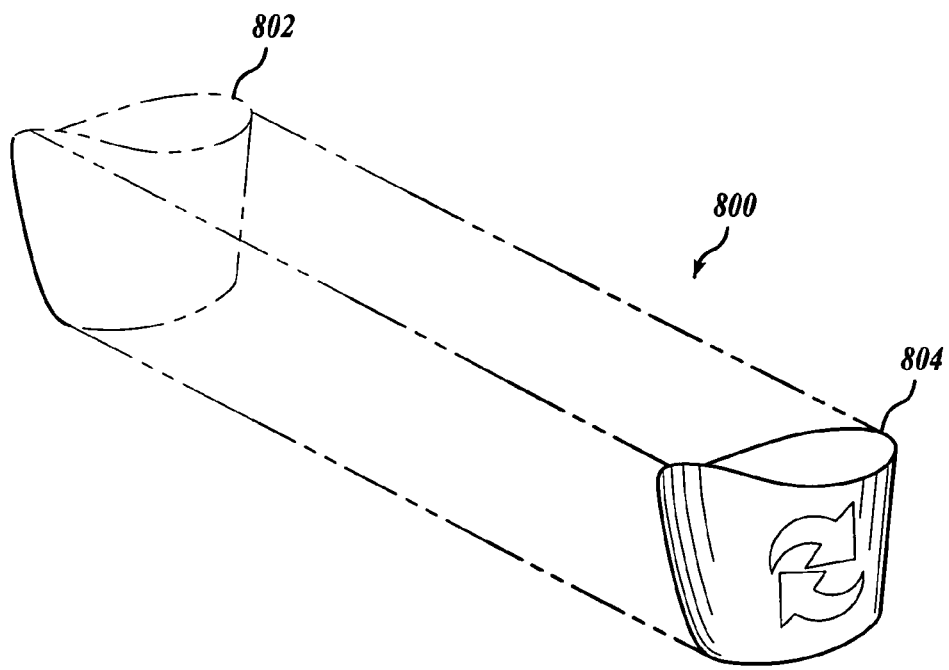
FIGS. 8 and 9 are pictorial diagrams illustrating exemplary static animation images and further illustrating movement and copy actions.
Figure 9:
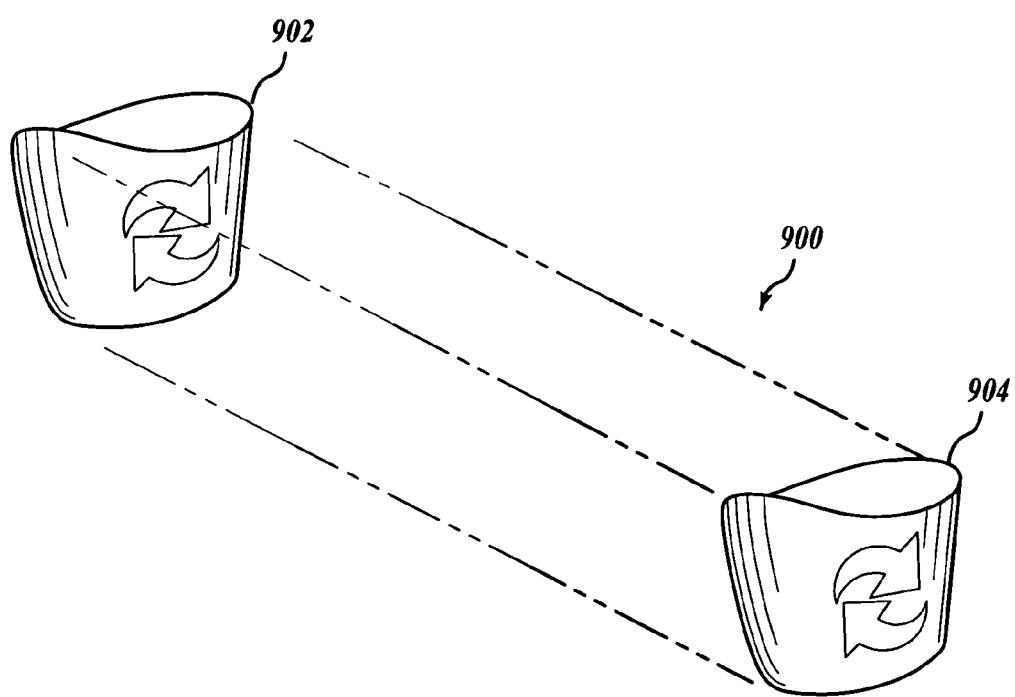

FIGS. 8 and 9 are pictorial diagrams showing static animation images suitable for illustrating the concept of moving versus copying an object. The static animation image 800 in FIG. 8 shows the final state of the object 804 as a solid, normally displayed object, indicative of a movement action. Moreover, the initial state 802 is displayed as an outline (or in some other fashion such as substantially transparent). Alternatively, the static animation image 900 in FIG. 9 shows both objects 902 and 904 displayed in a solid, normal fashion, indicative of a copy action. Another example of transient movement of icons using a static animation image is found in commonly assigned U.S. patent application Ser. No. US 2004/0150664, entitled *Accessing Remote Screen Content.*

Figure 10:
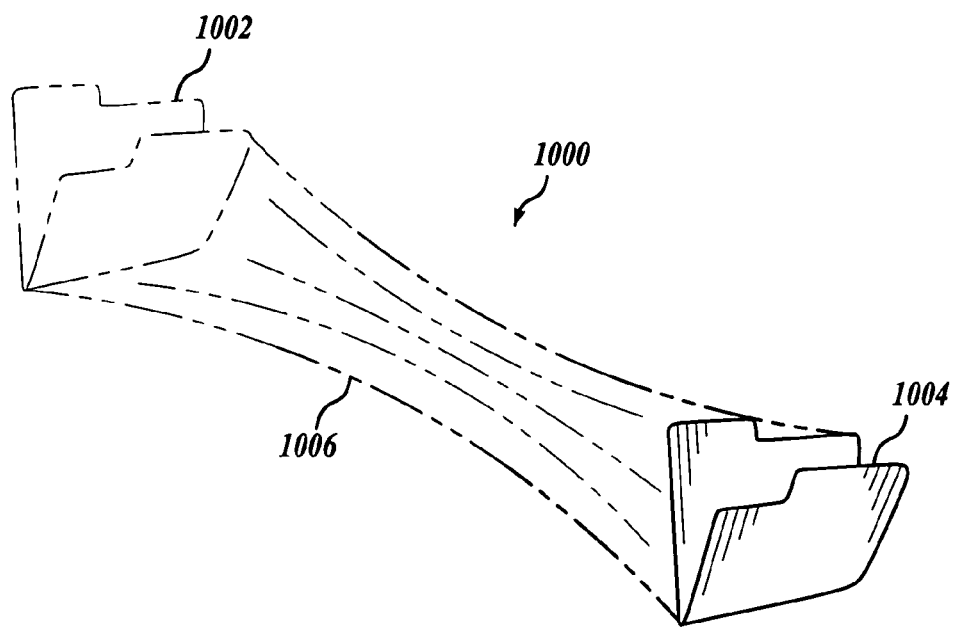
FIGS. 10 and 11 are pictorial diagrams illustrating exemplary static animation images and further illustrating transient actions.
Figure 11:
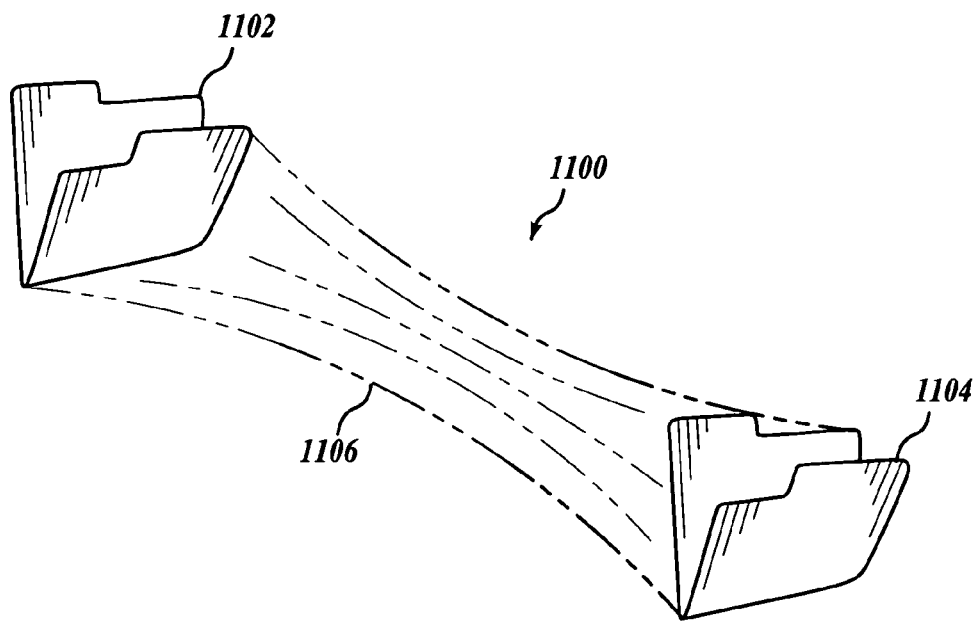

As those skilled in the art will appreciate, some actions are transient in nature, i.e., the effects are not permanent. According to at least one implementation, the transition aspects of the static animation image are concaved to indicate transience. FIGS. 10 and 11 are pictorial diagrams showing static animation images depicting transient actions. More particularly, FIG. 10 illustrates a temporary move of a folder from one location to another, i.e., folder 1002 being the initial state and folder 1004 being the final state, with the transition aspects 1006 concaved. Similarly, FIG. 11 illustrates a temporary copy of folder 1102 to folder 1104, again with transition aspects being displayed in a concave fashion. Notice that in FIG. 11, folder 1102 is displayed in its "normal" fashion rather than in outline form or transparent. As discussed above, this is indicative that there are really two folders, even though the copied folder 1104 is only a temporary folder.

Figure 14:
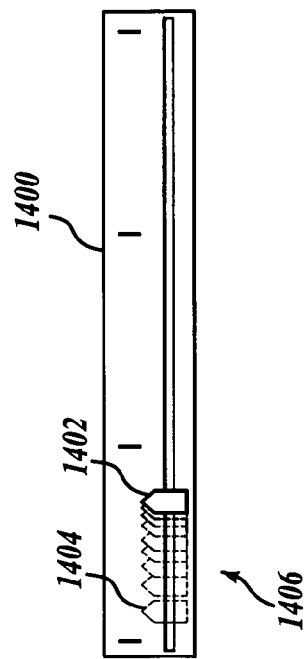
FIGS. 12-14 are pictorial diagrams illustrating exemplary static animation images with regard to common user interface controls.
Figure 13:
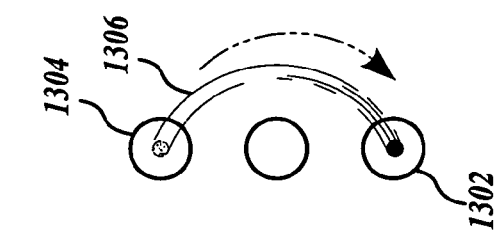
Figure 12:
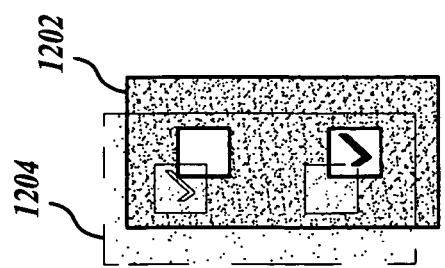

FIGS. 12-14 are pictorial diagrams illustrating additional exemplary static animation images. FIG. 12 illustrates a modification to a check box 1202, with the initial state 1204 displayed in outline format. Notice that in FIG. 12, there are no transition aspects displayed, just that the final state 1202 and initial state 1204 are offset and the initial state is rendered behind and differently (in outline) to the final state.

FIG. 13 illustrates a modification to a set of radio buttons, with button 1302 being the final state, button 1304 being the initial state, and further displaying transition aspects 1306. FIG. 14 illustrates an exemplary slider control 1400. The final state 1402 is displayed in normal fashion, indicating the final position of the slider after the action is completed. Additionally, the initial state 1404 is displayed in outline form. The transition aspects 1406 are generated using a strobe style, with the more recent positions displayed over the top of earlier positions.

Clearly, not all actions (and their corresponding animations) involve a movement or translation on the graphical user interface. In fact, quite frequently actions or manipulations on an object occur in generally the same locations, and displaying transition aspects in the same space does not display well as the final state simply occludes, all or in part, the initial state and the transition aspects. Accordingly, there are times that a pseudo transition path is useful in order to display all or some of the transition.

A pseudo transition path is a supplied path rather than an actual, logical path that the transition would normally follow. The transition aspects shown in FIGS. 1E and 1F are pseudo paths. With regard to FIGS. 1E and 1F, those skilled in the art will recognize that to bring icon 102 to the front in the Z-order would be a simple task of redisplaying the icon over icon 104. Yet, a simple switch, without more, can easily be overlooked or go unnoticed. Thus, a pseudo path, i.e., moving icon 102 up, over, and in front of icon 104, was supplied. Similarly, the transition aspects 118 shown in FIG. 1G are illustrative of an alternative pseudo path for moving icon 102 to the front of icon 104.

Figure 17:
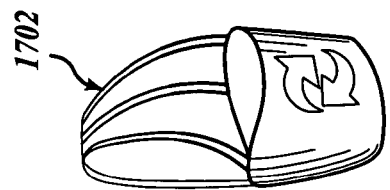
FIGS. 15-17 are pictorial diagrams illustrating exemplary static animation images and further illustrating pseudo path transition aspects.
Figure 16:
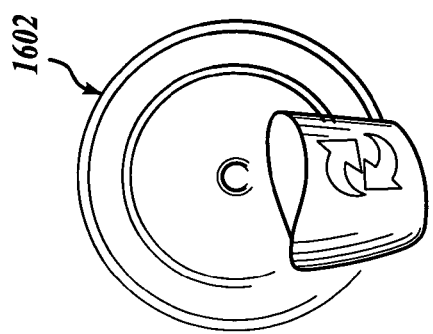
Figure 15:
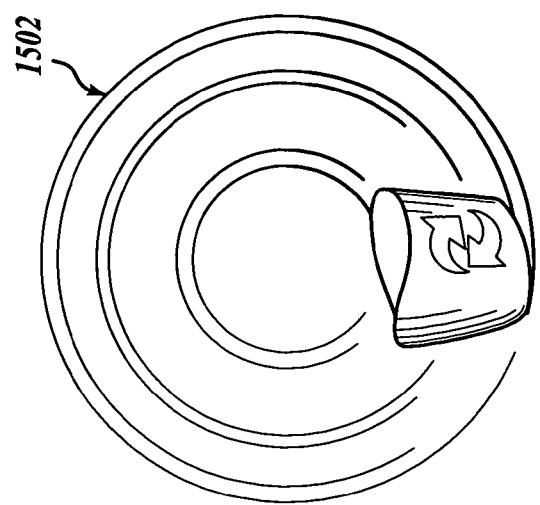

FIGS. 15-17 illustrate various pseudo paths supplied for actions that would otherwise go unnoticed in a static animation image. FIGS. 15 and 16 illustrate both large and small circular paths 1502 and 1602, parallel to the surface plane of a graphical user interface, that may be supplied in a static animation image. In contrast, FIG. 17 illustrates a semi-circular pseudo path 1702 generally perpendicular to the surface plane of a graphical user interface.

Figure 18:
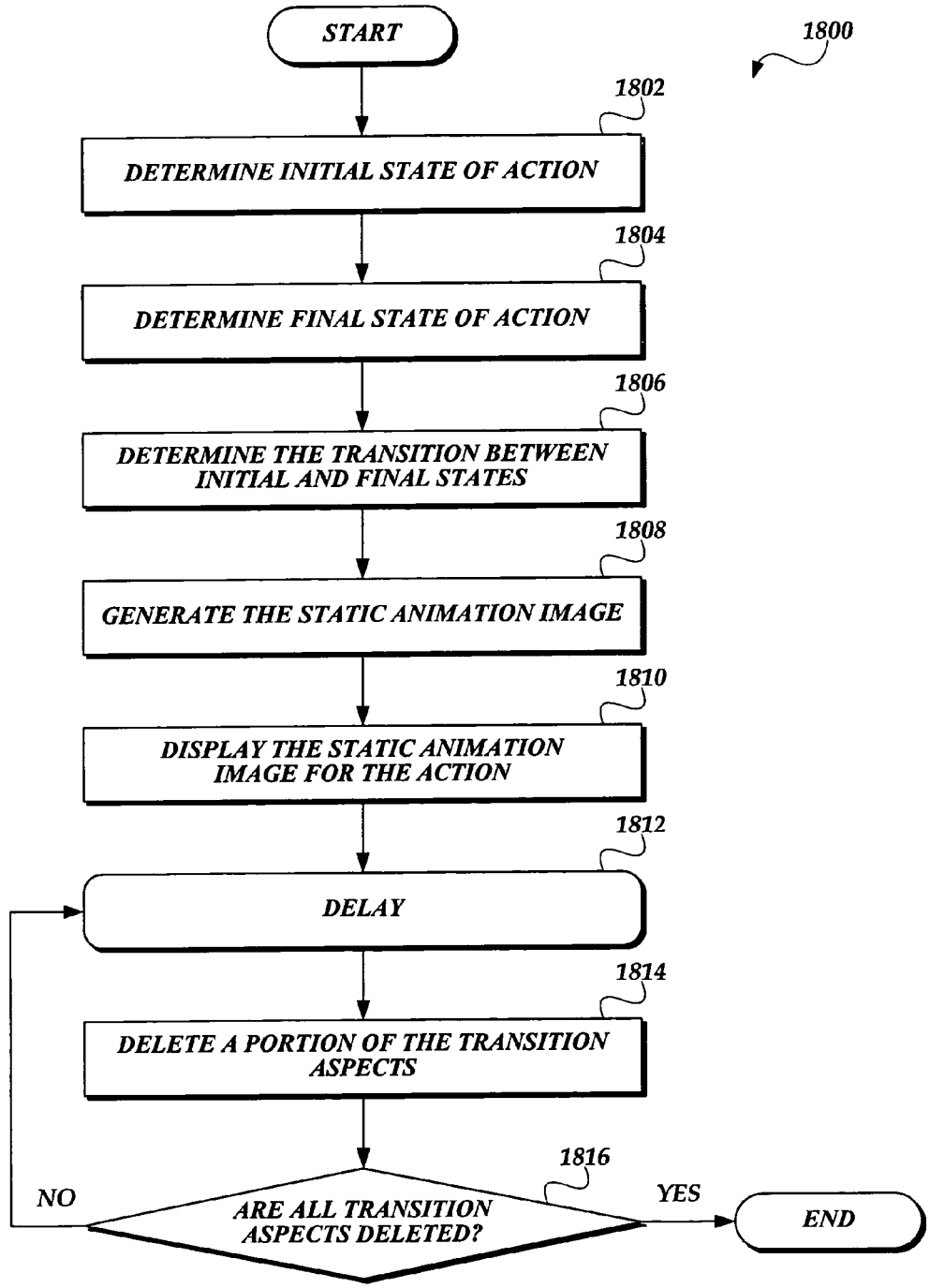
FIG. 18 is a flow diagram illustrating an exemplary routine for generating and displaying a static animation image in response to an action that has or is about to occur.

With regard to displaying a static animation image as an indicator on a graphical user interface that an action has or is about to occur, FIG. 18 is a flow diagram illustrating an exemplary routine 1800 for generating and displaying a static animation image in response to an action that has or is about to occur. This exemplary routine may be implemented on a computer system having a user interface capable of displaying static animation images, or may be included as computer-executable instructions recorded on a computer-readable medium.

Beginning at block 1802, the initial state of the objects affected by the action, and that will be the subject of the static animation image, is determined. While many displayable objects may be the subject of a single action and suitable for display in a static animation image, for purposes of the following discussion, it is assumed that the object is an icon, and moreover, that there is only one affected icon.

At block 1804, the final state of the icon is determined. At block 1806, a transition between the initial and final states is determined. Of course, as described above, this may include a transition path based on certain animation movements of the icon, a pseudo transition path, or not transition aspects at all (such as found in FIG. 12).

At block 1808, the static animation image is generated. As discussed above, a static animation image may be generated using any number of methods or styles such as, but not limited to, a strobe style, a motion blur style, or a transition lines style. Generating the static animation image includes displaying the initial state, the final state, and transition aspects (if any). Of course, as mentioned above, the initial state may need to be rendered in a fashion different from the final state, such as by applying substantial transparency to the initial state or displaying it in outline form. Once the static animation image is generated, at block 1810 the generated static animation image is displayed on the graphical user interface. Of course, it should be appreciated that generating the static animation image and displaying the generated image are, in many instances, logical and not actual divisions in the exemplary method 1800. More particularly, depending on particular implementation details regarding the generation and/or display of an image on a graphical user interface, generation and display could be one in the same, or separate actions.

To add the time element to animation such that the animation aspects disappear over time, at delay block 1812 the exemplary routine 1800 delays for a predetermined amount of time. After delaying, at block 1814, some portion of the transition aspects of the static animation image are deleted. Deleting may be accomplished by applying a increasingly greater degree of transparency to older portions of the transition aspects. However, any number of other ways of removing or fading out portions of the transition aspects may be used.

At decision block 1816, a determination is made as to whether there are any transition aspects in the static animation image that have not been deleted over time. If there are, the routine 1800 returns to delay block 1812 as described above. However, if there are no remaining transition aspects to remove, the exemplary routine 1800 terminates.

As those skilled in the art will appreciate, the exemplary method 1800 as well as generally displaying static animation images to provide a static, retrospective explanation of animation may be performed on most modern computer systems. Such computer systems will typically include a processor, memory, and a display device suitable for displaying a static animation image. Examples of such computer systems include, but are not limited to, personal computers, notebook and/or tablet computers, personal digital assistants (PDAs), hybrid PDA/wireless phone devices, mini- and mainframe computers, and the like.

While various embodiments have been illustrated and described, it will be appreciated that various changes can be made therein without departing from the spirit and scope of the invention.

The embodiments of the invention in which an exclusive property of privilege is claimed are defined as follows:

1. A computer-readable memory bearing computer-executable instructions which, when executed on a computer system having a graphical user interface, carry out a method for displaying a static animation image in response to an animation sequence for a displayed object that occurs on the computer system, the method comprising each of the following:
   determining an initial state of the displayed object prior to the animation sequence;
   determining a final state of the displayed object at the end of the animation sequence;
   determining transition aspects between the initial state and the final state, wherein determining the transition aspects between the initial state and the final state comprises determining a transition path of the displayed object from its initial state to its final state according to the animation sequence and determining a transition path of the displayed object from its initial state to its final state comprises generating a pseudo path, the pseudo path displaying transition corresponding to an action or manipulation of an object, the action or manipulation occurring in generally the same location, the displaying being in a manner that, at least in part, avoids occluding the initial state and the transition aspects, and the pseudo path being oblique to the path of the displayed object during the animation sequence;
   generating a static animation image, the static animation image simultaneously providing the transition aspects of the final state and including representative images of the initial state, the transition aspects, and the final state, the static animation image representing the entire animation sequence in static form from the initial state to the final state such that the static animation provides a retrospective view of the animation sequence; and
   outputting the static animation image for display on the graphical user interface in lieu of animation.

2. The computer-readable memory of claim 1, wherein generating a static animation image including representative images of the initial state, the transitions aspects, and the final state comprises generating strobe style transition aspects along the transition path.

3. The computer-readable memory of claim 1, wherein generating a static animation image including representative images of the initial state, the transitions aspects, and
the final state comprises generating motion blur transition aspects along the transition path.

4. The computer-readable memory of claim 1, wherein generating a static animation image including representative images of the initial state, the transitions aspects, and the final state comprises generating transition lines style transition aspects along the transition path.

5. The computer-readable memory of claim 1, wherein the transition aspects are formed in a particular manner indicative of the final state being a transient state.

6. The computer-readable memory of claim 1, wherein the transient aspects are formed in a particular manner indicative of a parent child relationship between the initial state and the final state.

7. The computer-readable memory of claim 1, wherein:
the initial state is output for display in a modified fashion from the final state; or
the initial state is displayed in the fashion as the final state when the results of the animation sequence generate a plurality of displayed objects.

8. The computer-readable memory of claim 1, the method further comprising removing the transition aspects of the static animation image over time.

9. The computer-readable memory of claim 1, wherein determining a transition path of the displayed object from its initial state to its final state comprises generating a pseudo path, the pseudo path being generally perpendicular to a surface plane of the graphical user interface.

10. A computer system for displaying static animation images representative of an animation sequence involving a displayed object on a graphical display device, the computer system comprising:
a processor;
a memory; and
a graphical display device;
wherein, in response to an action that occurs on the computer system, the computer system:
determines an initial and final state of the displayed object with regard to the animation sequence, the initial state corresponding to the displayed object prior to the animation sequence and the final state corresponding to the displayed object at the end of the animation sequence;
determines transition aspects between the initial state and the final state, by determining a transition path of the displayed object from its initial state to its final state according to the animation sequence and by generating a pseudo path, the pseudo path to display transition corresponding to an action or manipulation of an object, the action or manipulation to occur in generally the same location, the display to be in a manner that, at least in part, avoids occluding the initial state and the transition aspects, and the pseudo path to be oblique to the path of the displayed object during the animation sequence;
generates a static animation image, the static animation image simultaneously including representative images of the initial state, the transition aspects, and the final state, the static animation image representing the entire animation sequence in a single static form from the initial state to the final state; and
displays the static animation image on the graphical user interface in lieu of animation sequence.

11. The computer system of claim 10, wherein the computer system generates a static animation image including representative images of the initial state, the transitions aspects, and the final state by generating transition aspects along the transition path according to one of a strobe style, a motion blur style, or a transition lines style.

12. The computer system of claim 11, wherein the computer system determines a transition path of the displayed object from its initial state to its final state by generating a pseudo path oblique to the path of the displayed object during the animation sequence.

13. The computer system of claim 10, wherein in response to an action that occurs on the computer system, the computer system further removes the transition aspects of the static animation image over a predetermined amount of time from the initial display of the static animation image.

14. A method for displaying a static animation image representing an animation sequence of a displayed object that occurs on the computer system, the method comprising each of the following as executed on a computer system:
determining an initial state of the displayed object prior the animation sequence;
determining a final state of the displayed object at the end of the animation sequence;
determining a transition path between the initial state and the final state, which comprises generating a pseudo path, the pseudo path displaying transition corresponding to an action or manipulation of an object, the action or manipulation occurring in generally the same location, the displaying being in a manner that, at least in part, avoids occluding the initial state and the transition aspects, and the pseudo path being oblique to the path of the displayed object during the animation sequence;
generating a static animation image, the static animation image simultaneously including representative images of the initial state, the transition path, and the final state, the static animation image representing the entire animation sequence in a single static form from the initial state to the final state; and
outputting the static animation image for display on the graphical user interface in lieu of the animation sequence.

15. The method of claim 14, wherein generating a static animation image including representative images of the initial state, the transitions aspects, and the final state comprises generating transition aspects along the transition path according to one of a strobe style, a motion blur style, or a transition lines style.

16. The method of claim 15 further comprising removing the transition aspects along the transition path of the static animation image over a predetermined amount of time.

* * * * *

UNITED STATES PATENT AND TRADEMARK OFFICE
CERTIFICATE OF CORRECTION

| | | |
|---|---|---|
| PATENT NO. | : 8,487,937 B2 | Page 1 of 1 |
| APPLICATION NO. | : 11/325912 | |
| DATED | : July 16, 2013 | |
| INVENTOR(S) | : Robbins et al. | |

It is certified that error appears in the above-identified patent and that said Letters Patent is hereby corrected as shown below:

In the Specification

In Column 3, line 63, delete "axies," and insert -- axes, --, therefor.

Signed and Sealed this
Tenth Day of February, 2015

Michelle K. Lee
*Deputy Director of the United States Patent and Trademark Office*